May 25, 1965      B. L. LEWIS      3,185,852
SATELLITE SENSOR AND CONTROL SYSTEM
Filed Sept. 15, 1961
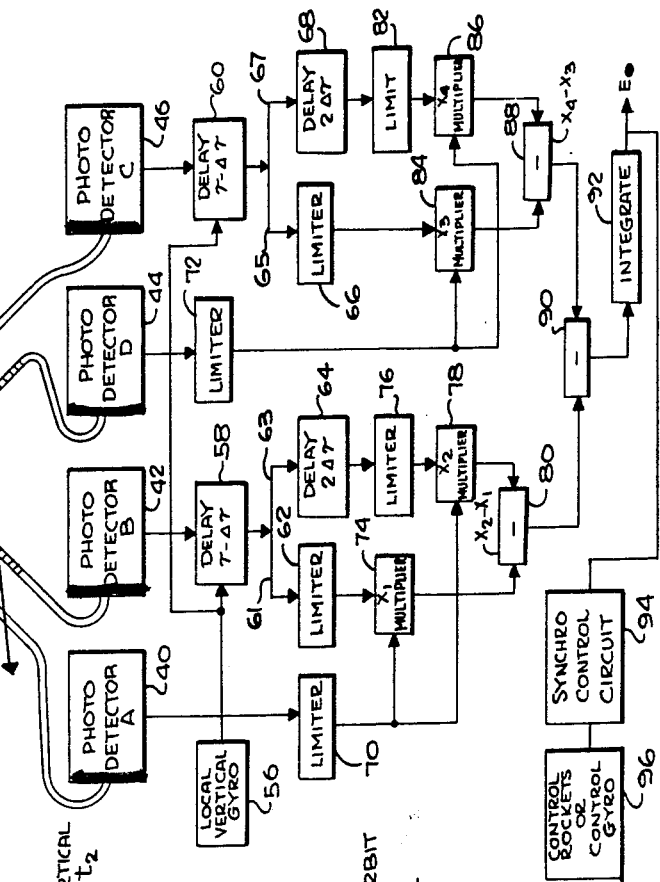
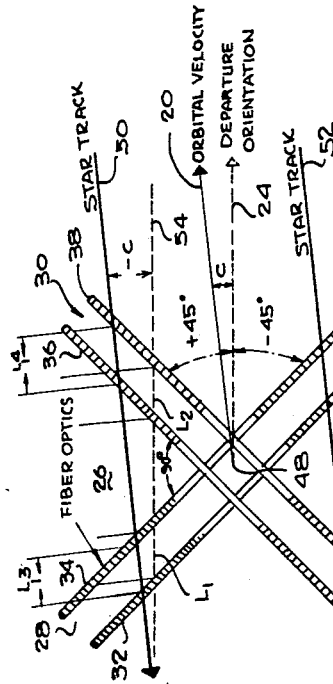
INVENTOR
BERNARD L. LEWIS
BY *Hurvitz and Rose*
ATTORNEYS

United States Patent Office 3,185,852
Patented May 25, 1965

3,185,852
SATELLITE SENSOR AND CONTROL SYSTEM
Bernard L. Lewis, Winter Park, Fla., assignor to Radiation, Incorporated, Melbourne, Fla., a corporation of Florida
Filed Sept. 15, 1961, Ser. No. 138,475
1 Claim. (Cl. 250—227)

This invention relates to a yaw sensor for use with a local vertical sensor in stabilizing a space vehicle in an orbit around solar and planetary bodies, and more particularly to a yaw sensor which senses rotation of the space vehicle about a line joining a planet or solar body and the satellite. Control means are provided to be responsive to the yaw sensor for maintaining orientation of the space vehicle in a given direction.

The local vertical sensor provides an output to control a space vehicle such as a satellite so that it always has one side turned toward a planet or solar body about which it is orbiting. As a consequence the satellite will rotate once per orbital revolution. The rotation will cause the star field in the opposite direction from the planet or solar body about which it is orbiting to appear to have an angular velocity equal to the angular rotation rate of the satellite. According to the invention, the yaw sensor is an electro-optical device that measures the satellite orientation about the local vertical (i.e. a ficticious line connecting the satellite with the center of a solar or planetary body) with respect to its orbital velocity vector by measuring apparent angular velocity differences in the star field in planes making 45° angles with a desired orientation of the satellite. The yaw sensor produces an error signal proportional to the difference between the apparent angular velocity and the desired angular velocity of the star field in given planes of measurement.

An object of this invention is to orient an orbiting space vehicle in a particular relationship with its velocity vector.

Another object of the invention is to provide a sensor for measuring the rotation of a satellite about a line connecting the satellite and the center of a planet.

Another object is to provide a sensor and control system for a satellite in orbit which produces an error output proportional to the amount of rotation of said satellite about a line connecting the satellite and the center of a planet.

Yet another object of the invention is to provide a satellite yaw sensor to detect rotation of an orbiting satellite about a local vertical, thereby eliminating the need of a gyroscope for this purpose.

A feature of this invention is the provision of a lens mounted in a satellite and having crossed rows of parallel lines of discrete optical fiber ends arranged in the focal plane thereof. The rows of optical fibers ends cross at an angle of 90°, and the lens is mounted in the satellite so that each row makes a 45° angle with respect to a given orientation of the satellite desired in orbit. The optical fiber ends collect light from star images moving across the crossed rows and lead the light to photo detectors. The photo detectors provide inputs through a control circuit which produces an error output for the purpose of correcting satellite orientation.

The orbital rotation of the satellite about the plant causes star images to move across the fiber ends in the focal plane of the lens. The optical fiber ends are arranged in two parallel lines in each of the crossed rows. If the desired orientation of the satellite is, for example, in the plane of the orbit and in the direction of orbital velocity, the star images will cross all fiber rows at the same rate. However, if the satellite departs from its desired orientation, star images will require a longer period of time in transit from one optical fiber line of a row to another optical fiber line of said row.

The satellite yaw sensor develops an error voltage proportional to the star image transit time and the error voltage is thus proportional to the degree of departure of the satellite from its desired orientation. The signals picked up by photocells from the optical fiber ends are fed into a circuit which correlates and translates the input information to produce an output error signal for conditioning a synchro-loop for reorienting the satellite to is desired orientation.

A better understanding of the invention will be had by reference to the drawings in which:

FIGURE 1 is a diagram of a satellite in orbit around a planet;

FIGURE 2 is a schematic block diagram of an illustrative embodiment.

Referring to the diagram of FIGURE 1 a heavenly body, for example, a planet around which the satellite is to orbit is shown at 10 and its center at 12. A satellite 14 is shown in an orbital path around the planet 10. Lines 16 and 18 are local verticals at times $t_1$ and $t_2$ respectively of the satellite position in its orbit. The local vertical is defined as the line connecting the satellite in orbit with the center of the planet around which the satellite is orbiting. At time $t_1$ the velocity vector of the satellite is shown at 20, at time $t_2$ the velocity vector is shown as being 22. Assuming that the desired orientation of the satellite is to be in the direction of its velocity vector, at time $t_1$ the angle between the local vertical 16 and a direction to a particular star is shown as being A, and at time $t_2$ is shown as being B. As is obvious from the diagram, as satellite 14 revolves around planet 10, the angle between the local vertical and a direction to a particular star is changing, and thus to the satellite 14 always pointing in the angle of local vertical of its velocity vector, the direction to a particular star has an apparent angular velocity. The apparent star field angular rotation rate, O, is equal to angle A minus B divided by the quantity $t_2$ minus $t_1$. However, if satellite 14 undesirably rotates about the local vertical, an additional component of angular velocity of the apparent star field will be introduced. This component of angular velocity may be measured to provide input through a control system for reorienting the satellite to its desired orientation.

Referring to FIGURE 2 and using the same reference numerals as in FIGURE 1 where they apply, 20 represents the velocity vector of the satellite in orbit. For the purpose of explaining the invention conveniently, it will be assumed that the desired orientation of the satellite is in the direction of orbital velocity and in the plane of the satellite orbit. A departure of the satellite from its desired orientation due to rotation (yaw) about a local vertical is indicated by the dashed line 24. According to the invention, crossed rows of optical fiber ends generally shown at 26 are located in the satellite in the focal plane of a lens (not shown). Each row of optical fiber ends, 28 and 30, consists of two parallel lines of discrete optical fiber ends. Optical row 28 has optical fiber end lines 32 and 34, and row 30 has optical fiber end lines 36 and 38. The crossed rows 28 and 30 subtend an angle of 90 degrees therebetween, and are located in the satellite so that each row 28 and 30 makes an angle of 45° with the line of desired orientation, in this case assumed to be the velocity vector indicated by line 20. For the sake of convenience, the angle of optical row 30 is designated as +45° and optical row 28 as being −45° with the line of desired orientation.

The ends of optical lines 36 and 38 are connected respectively to photodetectors 40 and 42, and the ends of optical lines 32 and 34 are connected respectively to photo detectors 44 and 46. The photo detectors 40, 42, 44, and 46 convert the light from optical fibers ends in lines 32, 34, 36 and 38 to electrical pulse energy in a well known manner. The crossed rows of fiber ends 28 and 30 as shown in FIGURE 2 are in the position of the satellite when it has departed from the desired orientation 20 so that the crossed rows are plus and minus 45° about line 24. Thus line 24 subtends an angle C with line 20, indicating that the satellite has yawed from line 20 to line 24 about the local vertical. The local vertical 48 is shown as a point, it being understood that the local vertical is a line extending into and out of the paper perpendicularly, the star field tracks 50 and 52 being indicated in the background.

A dashed line 54 parallel to line 24 has been drawn to indicate a star track if satellite 10 was in its desired orientation. In such a case, the sections of line 54 produced by the intersection of the optical rows 28 and 30, the sections being indicated as $L_1$ and $L_2$, would be equal in length. However, since satellite 10 has rotated through an angle C about local vertical 48, star tracks 50 and 52 are the actual tracks as seen by the optical system 26. Thus, for example, star track 50 intersected by the optical rows 28 and 30 produces sections thereof indicated as $L_3$ and $L_4$ of unequal length. Lengths $L_1$, $L_2$, $L_3$ and $L_4$ therefore indicate lengths of time required for a star image to cross the optical rows 28 and 30 along star tracks such as 50 or 52. It is the variation in time for the star images to cross rows 28 and 30 which is utilized to produce an output into the control circuit of the invention in order to correct for satellite yaw about a local vertical such as 48.

As shown in FIGURE 2, $L_4$ is greater than $L_3$ and angle C is negative. If angle C is positive, then $L_4$ will be less than $L_3$. As stated before, if the satellite 10 were in its desired orientation, optical system 26 would be tracking a star along line 54. Thus the transit time T of transit of a star tracked along line 54 across optical rows 28 and 30, for example, from optical fiber line 38 to line 36 would be functionally dependent upon the angular rotation rate of a star field. The proper value for T is determined by a relatively crude local vertical gyro 56 which measures the orbital rotation rate (star field rotation rate) of the satellite due to the action of local vertical sensor.

All outputs from photo detectors 42 and 46 are applied respectively to delays 58 and 60. Delay circuits 58 and 60 also receive an output from gyro 56 which produces a delayed function T in each of the circuits 58 and 60. Delayed function T is representative of the angular rotation rate of the satellite around the planet in terms of transit time of a star image across a row of optical fiber lines. The generation of function T may be carried out by recording the signals to be delayed as derived from detectors 42 and 46 on a magnetic drum driven by the local vertical gyro 56. Hence, any changes in the rotation rate of satellite 14 about planet 10 are reflected in variations in the delay times introduced by elements 58 and 60. Rotation rate changes are so slow that they have no effect on the relative frequencies of the signals deriving from delay 58 and detector 40 or from delay 60 and detector 44. By playing the recorded signals back on magnetic heads displaced from the record heads by an amount proportional to the spacing between the optical fiber lines an additional delay indicated as $\Delta T$ is introduced in each delay circuit 58 and 60 in order to provide an incremental delay function $T+\Delta T$ as a basis for correlation. The correlation to be made will be a determination of whether it takes a greater period of time for a star image to pass from optical fiber line 38 to line 36, or from optical line 34 to line 32. To carry this out, the output from each of the photodetectors 42 and 46 respectively associated with the leading optical fiber lines 38 and 34 respectively are delayed so that correlation can be made to determine to which row 28 or 30 provides a correlated output which is more closely correlated with the transit time of a star image from one optical fiber line to another. Accordingly, photo detector 40 provides a pulse output from optical fiber line 36, and through photo detector 44 a pulse output of optical fiber line 32, to provide channels respectively for correlation with the output channels of photo detectors 42 and 46. The outputs of photo detectors 42 and 46 after being fed into compensatory angular rotation rate delay circuits 58 and 60 are then divided to provide two channels for correlation with the channels of the outputs of photo detectors 40 and 44. The divided output of delay circuit 58 is passed through a sub-channel 61 having a limiter 62 which eliminates noise and transients and from the limiter 62 to a first multiplier 74. The other output from delay circuit 58 is fed through a second sub-channel 63 and is further delayed by an amount $2\Delta T$ in delay circuit 64. The further delay of $2\Delta T$ introduced in delay circuit 64 is for the purpose of providing a correlation basis for the determination of the yaw departure of the satellite from the orientation desired. The output of delay circuit 64 is then fed through a noise eliminating limiter 76 to a second multiplier 78.

In the same manner the output of delay circuit 60 is divided into sub-channels 65 and 67, where being provided in the first sub-channels 65 a limiter 66 and a third multiplier 84, and in the other divided output forming sub-channel 67 a further delay circuit providing additional delay $2\Delta T$ at 68, a limiter 82, and a fourth multiplier 86. In the first multiplier 74 the limited output of photo detector 40 is multiplied with a delayed function in the first channel output of delay circuit 58. Also, in the second multiplier 78, the limited output of photo detector 40 is multiplied with the further delayed output of delay circuit 58 in the second sub-channel.

The outputs of multipliers 74 and 78 are fed into a subtracting circuit 80. In subtracting circuit 80 the output of multiplier 74 is compared with the output of multiplier 78. If the output of subtractor 80 is a positive function, there is an indication that the transit time of a star image from optical fiber line 38 to optical fiber line 36 is an increasing function, that is, the optical system 26 (with satellite 10) is rotating clockwise because the transit time of a star image from optical fiber line 38 to optical fiber line 36 has increased. In a similar manner the outputs of the third multiplier 84 and the fourth multiplier 86 in the channels of photo detector 44 and 46 are fed into a multiplier 88, where the output of multiplier 84 is subtracted from the output of multiplier 86. The outputs of subtractors 80 and 88 are then fed into another subtractor circuit 90. The output of subtractor 90 may be zero, positive, or negative voltage depending upon whether the satellite is in its desired orientation, has rotated clockwise, or counterclockwise, respectively. The output of subtractor 90 is fed into integrating circuit 92 which smooths the output pulses from 90 to provide a smooth control signal to serve as an input to a synchro control circuit 94 which in turn controls control rockets or a control gyro or other suitable satellite control means indicated at 96.

In operation, the optical system 26 is fixedly mounted in satellite 10 and is positioned as previously explained so that the rows 28 and 30 subtend angles of 45° with the line 20 of desired orientation of the satellite, which may be, for example, in the forward direction or velocity vector of the satellite. In other words, the desired orientation of the satellite 10 may be so that the satellite 10 is always pointed in a forward direction throughout its entire direction around a planet. In this instance, during one revolution of satellite 10 about a planet 12 the satellite rotates once.

Assume now that satellite 10 having the optical system 26 therein is now in orbit but has rotated through an angle indicated as C about local vertical 48 so that it is disorientated from the desired orientation indicated by the angle C. In other words, satellite 10 instead of pointing in the desired orientation direction indicated by line 20, is now pointing in the direction of line 24 which differs from line 20 by an angle C. In such an instance it is apparent that the transit time for a star image to cross optical line 38 to optical line 36 is greater than the transit of the star image to cross from optical line 34 to optical line 32. As lines 28 and 30 move across star track 50 the respective photodetectors generate pulses at frequencies $F_1$ and $F_2$, respectively. Frequency $F_1$ is greater than frequency $F_2$ because lines 28 are exposed to tracks 50 for a shorter time than lines 30, hence the fiber bundles thereof chop the star image at a higher rate than do the bundles of lines 30. The signal coupled to detector 40 is phase advanced relative to that of detector 42 because image 50 is encountered by line 36 prior to the time the image is encountered by line 38. Similarly, the signal picked up by detector 46 is phase advanced relative to that derived from detector 44.

Because of the negative phase displacement direction between the pulses deriving from detectors 40 and 42 there is a better cross correlation in the $+\Delta T$ channel comprising multiplier 78 than in the $-\Delta T$ channel comprising multiplier 74, so the output of the former is greater in amplitude than the latter. In response to the signals deriving from multipliers 74 and 78, subtractor 80 generates positive pulses which indicate the phase direction of the signals coupled to detectors 40 and 42. The frequency of the pulses derived from comparator 80 is proportional to $F_1$.

In a similar, but opposite manner, there is a better cross correlation of the signals coupled to multiplier 84 than multiplier 86. As a consequence, the output from subtractor 88 comprises negative pulses indicative of the phase direction of the signals coupled to detectors 44 and 46, which pulses have a frequency proportional to $F_2$.

Thus, the pulses deriving from subtractors 80 and 88 are of polarities which indicate the direction of vector 20 relative to line 24. The frequencies of the pulses indicate the extent of departure of vector 20 from line 24. The pulses from subtractors 80 and 88 are subtracted and integrated in components 90 and 92 to derive a positive signal having a magnitude proportional to the angle C between lines 20 and 24.

As the correction output voltage from integrator 90 is fed into a control system to reorient the satellite 10 to its desired orientation, and as the satellite 10 actually rotates into that position of desired orientation in its orbit, the transit time of a star image from optical fiber line 34 from optical fiber line 32 will be increasing, and that of optical fiber lines 38 and 36 will be decreasing. When the satellite 10 has returned to its desired orientation, for example, so that the satellite is pointing in the direction of line 20, the output of multipliers 74 and 78 is equal to the outputs of multiplier 84 and 86 since the transit time of star images across all optical fiber lines is the same. Thus the output from subtractor 80 is equal to the output of subtractor 88, and no difference voltage is produced in subtractor 90.

If the satellite 10 rotates in a counterclockwise direction, the output of subtractor 88 will be greater but in a negative direction than the output of subtractor 80, and a negative control signal will be generated by subtractor 90 to provide the basis of an error control voltage smoothed in integrator 92.

It will be evident to those skilled in the art that instead of the correlation type control system shown as an illustrative embodiment of this invention, other types of control systems for generating output voltages indicating the orientation of the satellite 10 may be used. For example, comparison techniques may be used wherein the outputs of photo detectors 40 and 42 generate a voltage which is continuously compared with the outputs of photo detectors 44 and 46. The initial output comparison between the pairs of photo detectors 40, 42, and 44, 46 may produce a given function, said function indicating the position of desired orientation of the satellite 10 when in orbit. In this instance, the departure of the satellite 10 from its position of desired orientation would produce an error voltage between the two sets of photo detectors 40, 42, and 44, 46, the compared output therebetween producing an error control voltage which may then be passed through control equipment for reorienting the satellite 10.

It will be further apparent that instead of using optical cross rows 28 and 30 each consisting of a pair of optical fiber lines, the optical fiber lines may be oriented differently, for example, in the form of a square or other geometrical configurations through which the transit time of a star image may be measured. Other configurations of the optical fiber lines in the satellite 10 will therefore occur to those skilled in the art.

While a particular embodiment of my invention has been shown, and particular configurations and characteristic control systems have been specified in an exemplary manner, it will be understood by those skilled in the art that such configurations and characteristic control systems are intended as illustrative of an embodiment of the invention rather than as limiting the invention to details thereof. I therefore desire to include within the scope of my invention defined by the following claim all such similar modified constructions whereby the results of my invention may be obtained by substantially the same or equivalent means.

What is claimed is:

Apparatus for sensing and controlling the rotation of a space vehicle about a local vertical comprising first and second pairs of parallel optical lines, each line consisting of a plurality of discrete optical fiber ends, there being an angular displacement between said pairs, photodetector means connected to each optical line for producing pulses responsive to an image thereon, a time delay channel connected to said photodetector means of one optical line of each pair, a direct channel connected to said photodetector means of the other optical line of each pair, a sub-channel having further time delay means therein connected to each time delay channel, means to multiply the output of said direct channel of each pair by the outputs of the time delay channel and of the sub-channel respectively of that same pair, means to compare the multiplied output of said time delay channel with the multiplied output of said channel of each pair, and means to subtract the compared output of said time delay channel and subchannel of one pair from the compared output of said time delay channel and subchannel of said other pair.

References Cited by the Examiner

UNITED STATES PATENTS

| | | | |
|---|---|---|---|
| 2,591,864 | 4/52 | Peter et al. | 88—1 |
| 2,833,936 | 5/58 | Ress | 250—227 X |
| 2,882,783 | 4/59 | Blackstone | 250—220 X |
| 2,995,662 | 8/61 | Hamilton | 250—220 X |
| 2,998,529 | 8/61 | Nichinson et al. | 250—203 |
| 3,037,289 | 6/62 | Garbarini et al. | 250—203 X |
| 3,060,319 | 10/62 | Greunke | 250—227 X |
| 3,080,485 | 3/63 | Saxton | 250—203 |
| 3,084,261 | 4/63 | Wilson | 250—203 |
| 3,110,812 | 11/63 | Hulett et al. | 250—203 |

RALPH G. NILSON, *Primary Examiner.*

WALTER STOLWEIN, *Examiner.*